(12) United States Patent
Sann

(10) Patent No.: US 9,421,409 B2
(45) Date of Patent: Aug. 23, 2016

(54) MOBILE FRAME ASSEMBLY FOR OBSTACLE COURSE SYSTEMS

(71) Applicant: Sam Sann, Houston, TX (US)

(72) Inventor: Sam Sann, Houston, TX (US)

(73) Assignee: Ninja Warrior Mobile, LLC, Houston, TX (US)

( * ) Notice: Subject to any disclaimer, the term of this patent is extended or adjusted under 35 U.S.C. 154(b) by 0 days.

(21) Appl. No.: 14/918,270

(22) Filed: Oct. 20, 2015

(65) Prior Publication Data

US 2016/0074687 A1    Mar. 17, 2016

Related U.S. Application Data

(63) Continuation of application No. 14/602,401, filed on Jan. 22, 2015, now Pat. No. 9,192,867, which is a continuation of application No. PCT/US2014/055131, filed on Sep. 11, 2014.

(51) Int. Cl.
*A63G 31/00* (2006.01)
*A63K 3/04* (2006.01)
(Continued)

(52) U.S. Cl.
CPC . *A63B 9/00* (2013.01); *A63B 17/02* (2013.01); *A63B 71/0054* (2013.01); *A63G 31/00* (2013.01); *A63J 3/00* (2013.01); *A63K 3/04* (2013.01); *B60P 3/025* (2013.01); *B62D 63/08* (2013.01); *A63B 2071/0063* (2013.01)

(58) Field of Classification Search
CPC ...... A63B 9/00; A63B 17/04; A63B 209/006; A63B 2208/12; A63B 2009/002; A63G 31/00; A63G 2200/00

USPC ........... 472/3, 136, 137; 482/35, 37, 146, 908
See application file for complete search history.

(56) References Cited

U.S. PATENT DOCUMENTS 5,405,304 A    4/1995    Petersheim et al.
5,762,503 A    6/1998    Hoo et al.
(Continued)

FOREIGN PATENT DOCUMENTS

DE    29907138 U1    10/1999
DE    20218912 U1    3/2003
(Continued)

OTHER PUBLICATIONS

International Search Report and Written Opinion, PCT/US2014/055131, Dec. 22, 2014.

*Primary Examiner* — Kien Nguyen
(74) *Attorney, Agent, or Firm* — Lawrence Youst PLLC

(57) ABSTRACT

A mobile frame assembly includes a trailer assembly having a trailer body, a draw assembly and wheels. The mobile frame assembly includes a base assembly, an intermediate assembly and an upper assembly each having at least two primary rails. Lower support risers are coupled to the base assembly primary rails and extend to the intermediate assembly primary rails forming a lower frame assembly. Upper support risers are coupled to the intermediate assembly primary rails and extend at least to the upper assembly primary rails. A platform assembly including a launch platform, a landing platform and a safety pit positioned therebetween is disposed at least partially within the lower frame assembly. An obstacle assembly is disposed generally within the mobile frame assembly over the safety pit, wherein at least some of the upper support risers are telescoping members operable to expand the distance between the obstacle and the safety pit.

20 Claims, 13 Drawing Sheets

(51) Int. Cl.
*A63B 9/00* (2006.01)
*B62D 63/08* (2006.01)
*B60P 3/025* (2006.01)
*A63B 17/02* (2006.01)
*A63B 71/00* (2006.01)
*A63J 3/00* (2006.01)

(56) References Cited

U.S. PATENT DOCUMENTS

| | | | |
|---|---|---|---|
| 6,001,020 | A | 12/1999 | Nagelski |
| 6,053,824 | A | 4/2000 | Boudreaux |
| 6,393,769 | B1 | 5/2002 | Mertik et al. |
| 6,499,258 | B1 * | 12/2002 | Borglum .................. B60S 9/04 254/418 |
| 7,811,044 | B2 * | 10/2010 | Warhurst .............. B60P 1/6445 414/458 |
| 8,038,589 | B2 | 10/2011 | Sperry |
| 8,066,578 | B2 | 11/2011 | Liggett |
| 8,574,085 | B1 | 11/2013 | Jackson |
| 8,678,941 | B2 | 3/2014 | Bilsen et al. |

FOREIGN PATENT DOCUMENTS

| | | |
|---|---|---|
| WO | WO 91/08806 | 6/1991 |
| WO | WO 2010/112953 A1 | 10/2010 |
| WO | WO 2013/162465 A1 | 10/2013 |

* cited by examiner

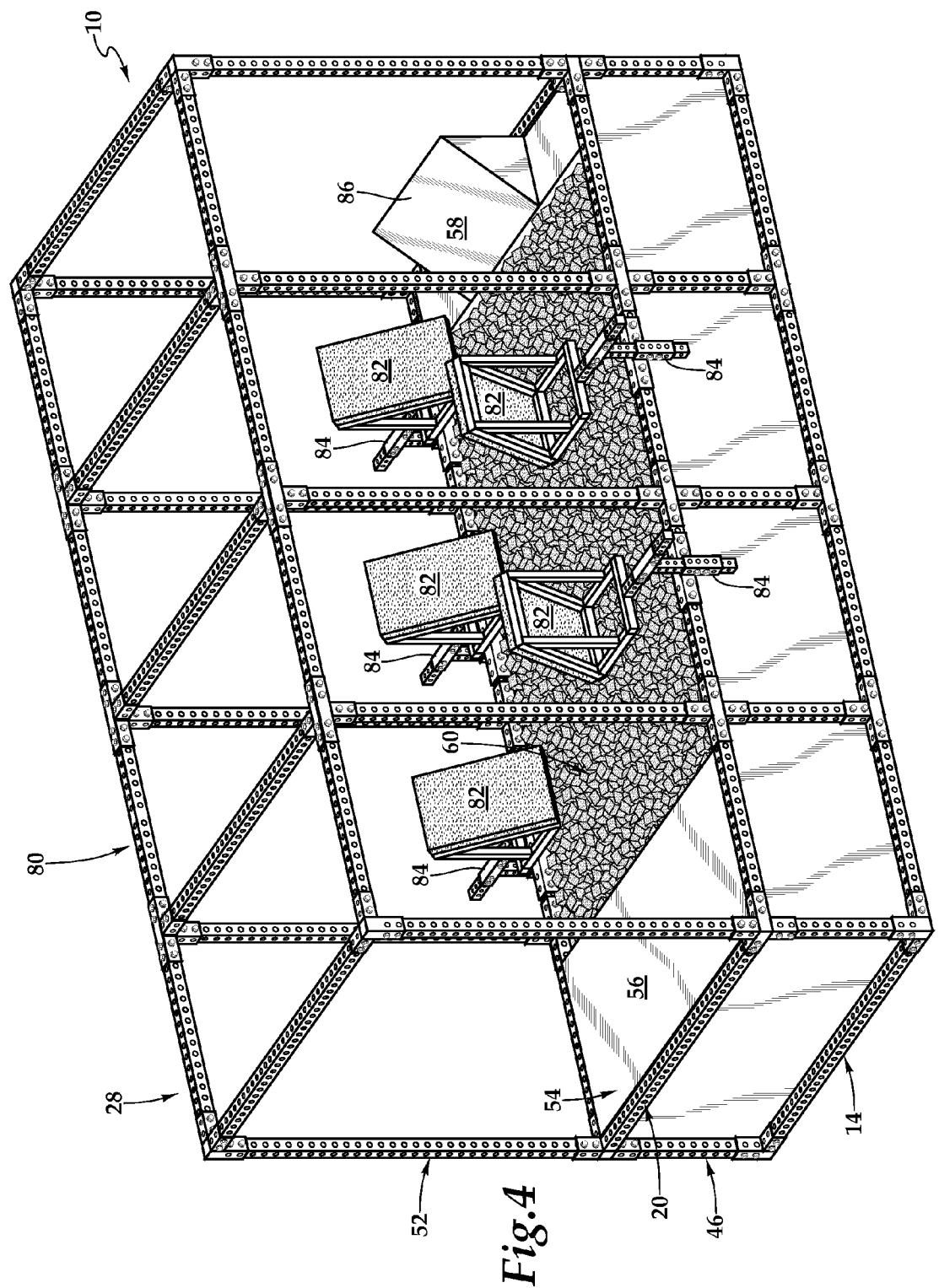

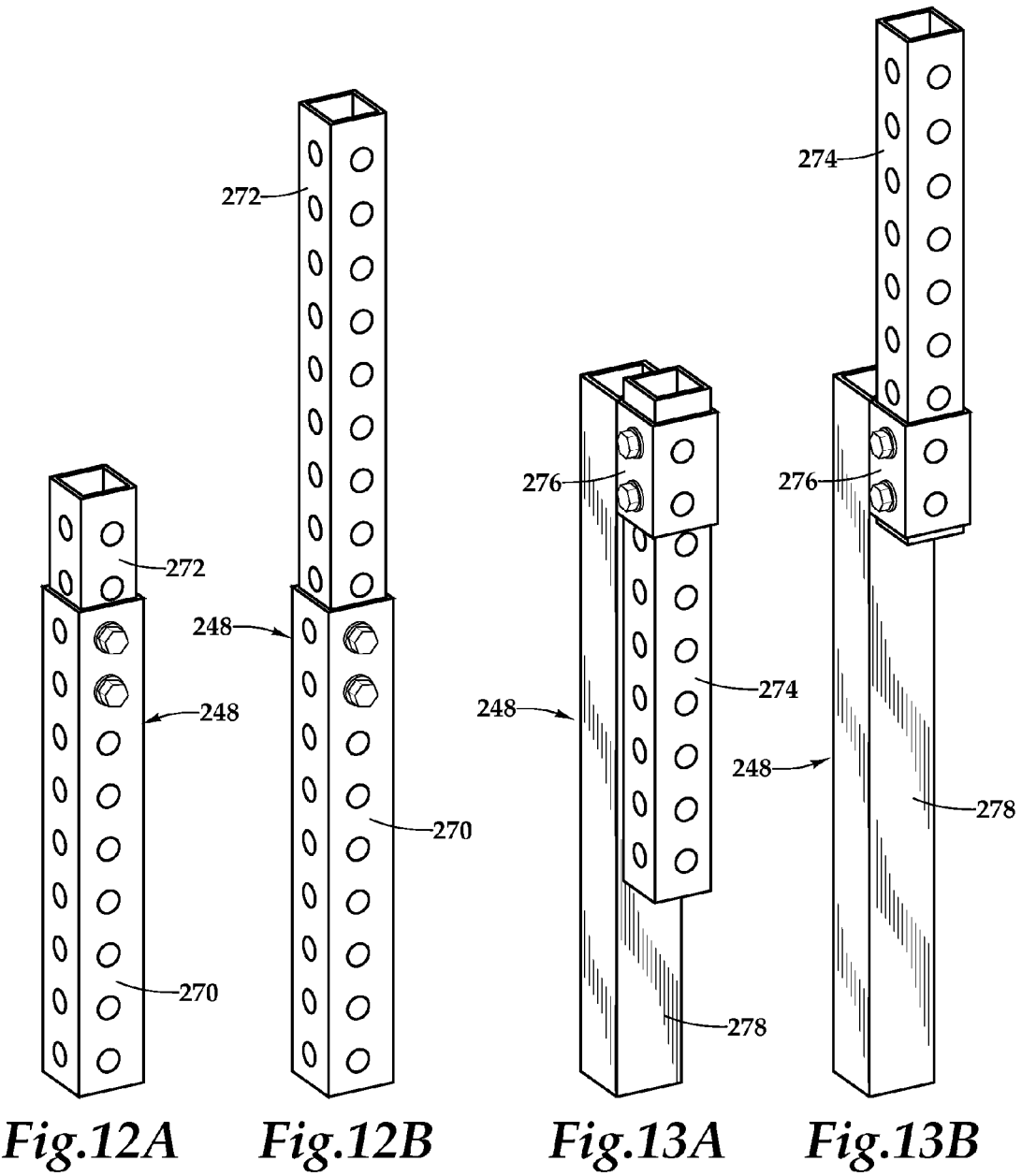
*Fig.12A*  *Fig.12B*  *Fig.13A*  *Fig.13B*

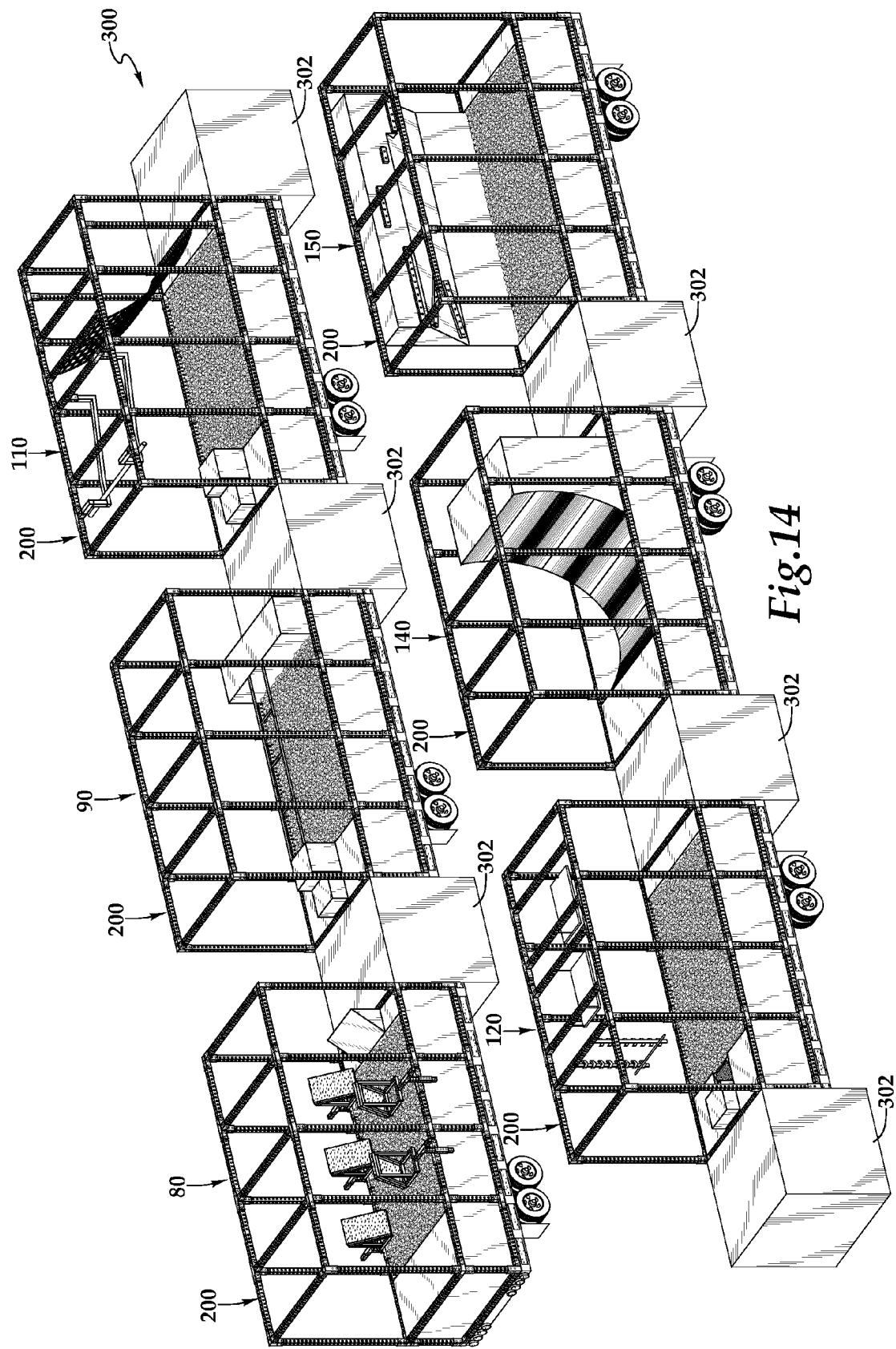

MOBILE FRAME ASSEMBLY FOR OBSTACLE COURSE SYSTEMS

CROSS-REFERENCE TO RELATED APPLICATIONS

The present application is a continuation of co-pending application Ser. No. 14/602,401, filed Jan. 22, 2015 which is a continuation of international application number PCT/US2014/055131, filed Sep. 11, 2014.

TECHNICAL FIELD OF THE DISCLOSURE

This disclosure relates, in general, to equipment utilized in conjunction with fitness training and competition and, in particular, to a mobile frame assembly for obstacle course systems enabling functional fitness training and competition in a challenging and safe environment on adjustable and interchangeable obstacles.

BACKGROUND

It is well known that regular exercise and physical activity provide significant health benefits, regardless of age, sex or physical ability. For example, exercise can help stimulate weight loss, promote muscle growth, combat health conditions and diseases, improve mood, boosts energy and enhance sleep. In addition, exercise can be a fun activity that gives the participants a chance to unwind, enjoy the outdoors or engage with family or friends in a social setting.

In recent years, a variety of competitions such as mudder races and cross fit games have focused attention on functional fitness training and have popularized gyms offering such training Some of the benefits of functional fitness training including improving strength and cardiovascular fitness as well as improving endurance, stamina, flexibility, power, speed, coordination, agility, balance, accuracy and obstacle course performance. In general, the benefits of functional fitness training arise from utilizing the body's natural ability to move in multiple degrees of freedom as compared to conventional training using weight machines that may restrict movements to a single, unnatural plane of motion potentially resulting in faulty movement patterns.

Other competitions such as Sasuke in Japan and American Ninja Warrior in the United States have showcased elite athletes competing on a multistage obstacle course. During these competitions, obstacles such as the jump hang, the devil steps, the monkey pegs, the unstable bridge and the salmon ladder not only require the athletes to traverse a unique and complicated apparatus, but also to accomplish these tasks at a significant distance above the ground. To ensure the safety of the competitors, many of these obstacles are typically positioned above a water pit that catches competitors unable to complete the entire obstacle. It has been found, however, that due to factors including the complexity of the obstacle, the space required to build an obstacle course and the safety requirements associated with an obstacle course, obstacle training and obstacle course competitions are generally not available in local gyms, parks or other recreational facilities.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 4 is a perspective view of a versatile frame assembly supporting a quintuple steps obstacle according to an embodiment of the present disclosure;

FIGS. 12A-13B are perspective views of connection members for a mobile frame assembly for obstacle course systems according to embodiments of the present disclosure; and FIG. 14 is a perspective view of a plurality of mobile frame assemblies supporting obstacles in an obstacle course configuration according to an embodiment of the present disclosure.

DETAILED DESCRIPTION

Figure 1:
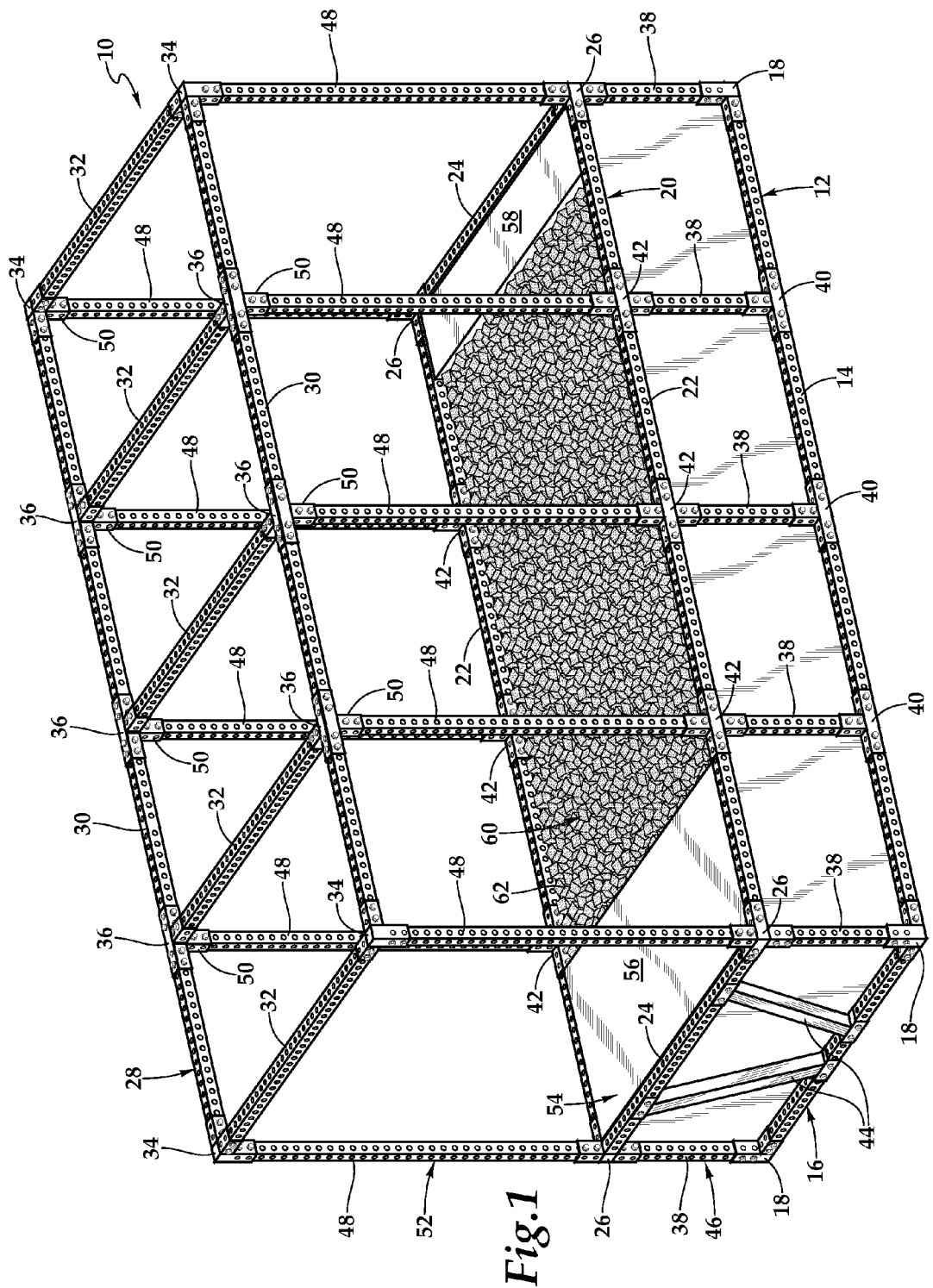
FIG. 1 is a perspective view of a versatile frame assembly for obstacle course systems according to an embodiment of the present disclosure.

While various systems, methods and other embodiments are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure.

In one aspect, the present disclosure is directed to a versatile frame assembly for obstacle course systems. The versatile frame assembly includes a base assembly having at least two base assembly primary rails and at least two base assembly cross rails, the base assembly primary rails coupled to the base assembly cross rails; an intermediate assembly having at least two intermediate assembly primary rails and at least two intermediate assembly cross rails, the intermediate assembly primary rails coupled to the intermediate assembly cross rails; an upper assembly having at least two upper assembly primary rails and at least two upper assembly cross rails, the upper assembly primary rails coupled to the upper assembly cross rails; a plurality of lower support risers coupled between the base assembly primary rails and the intermediate assembly primary rails forming a lower frame assembly; a plurality of upper support risers coupled between the intermediate assembly primary rails and the upper assembly primary rails forming an upper frame assembly; a platform assembly including a launch platform, a landing platform and a safety pit positioned therebetween, the platform assembly disposed generally within the lower frame assembly; and at least one obstacle assembly disposed generally within the upper frame assembly over the safety pit.

In some embodiments of the versatile frame assembly, the safety pit may include a generally monolithic lower pad layer and a distributed upper pad layer. In other embodiments, the safety pit may include a resilient lower layer and a distributed upper pad layer. In certain embodiments of the versatile frame assembly, the obstacle assembly may be selected from the group consisting of agility obstacles, balance obstacles and strength obstacles. In some embodiments of the versatile frame assembly, the obstacle assembly may be secured to one or more of the platform assembly, the intermediate assembly and the upper assembly.

In another aspect, the present disclosure is directed to a mobile frame assembly for obstacle course systems. The mobile frame assembly includes a trailer assembly having a trailer body, a draw assembly coupled to the trailer body and wheels operably associated with the trailer body; a base assembly securably mounted to the trailer assembly, the base assembly having at least two base assembly primary rails and at least two base assembly cross rails, the base assembly primary rails coupled to the base assembly cross rails; an intermediate assembly having at least two intermediate assembly primary rails and at least two intermediate assembly cross rails, the intermediate assembly primary rails coupled to the intermediate assembly cross rails; an upper assembly having at least two upper assembly primary rails and at least two upper assembly cross rails, the upper assembly primary rails coupled to the upper assembly cross rails; a plurality of lower support risers coupled between the base assembly primary rails and the intermediate assembly primary rails forming a lower frame assembly; a plurality of upper support risers coupled between the intermediate assembly primary rails and the upper assembly primary rails forming an upper frame assembly; a platform assembly including a launch platform, a landing platform and a safety pit positioned therebetween, the platform assembly disposed generally within the lower frame assembly; and at least one obstacle assembly disposed generally within the upper frame assembly over the safety pit.

In some embodiments of the mobile frame assembly, the trailer assembly may include at least one support leg. In certain embodiment of the mobile frame assembly, the upper support risers may be telescoping members operable to adjust the distance between the intermediate assembly and the upper assembly. In at least one such embodiment, the telescoping members may include inner and outer sleeve members wherein, in a first configuration, the inner sleeve member are slidable within the outer sleeve members and, in a second configuration, the inner sleeve members are secured to the outer sleeve members.

In another aspect, the present disclosure is directed to an obstacle course system that includes a plurality of versatile frame assemblies positioned in sequence relative to one another, the versatile frame assemblies including: a base assembly having at least two base assembly primary rails and at least two base assembly cross rails, the base assembly primary rails coupled to the base assembly cross rails; an intermediate assembly having at least two intermediate assembly primary rails and at least two intermediate assembly cross rails, the intermediate assembly primary rails coupled to the intermediate assembly cross rails; an upper assembly having at least two upper assembly primary rails and at least two upper assembly cross rails, the upper assembly primary rails coupled to the upper assembly cross rails; a plurality of lower support risers coupled between the base assembly primary rails and the intermediate assembly primary rails forming a lower frame assembly; a plurality of upper support risers coupled between the intermediate assembly primary rails and the upper assembly primary rails forming an upper frame assembly; a platform assembly including a launch platform, a landing platform and a safety pit positioned therebetween, the platform assembly disposed generally within the lower frame assembly; and at least one obstacle assembly disposed generally within the upper frame assembly over the safety pit.

In some embodiments of the obstacle course system, at least two of the versatile frame assemblies are secured together. In certain embodiments of the obstacle course system, groups of versatile frame assemblies are positioned in rows. In some embodiments of the obstacle course system, the versatile frame assemblies may include a trailer assembly having a trailer body, a draw assembly coupled to the trailer body and wheels operably associated with the trailer body and wherein the base assembly of respective versatile frame assemblies is securably mounted the trailer assembly. In such embodiments, bridge assemblies may extend between at least two of the versatile frame assemblies over at least one of the draw assemblies.

Figure 2A:
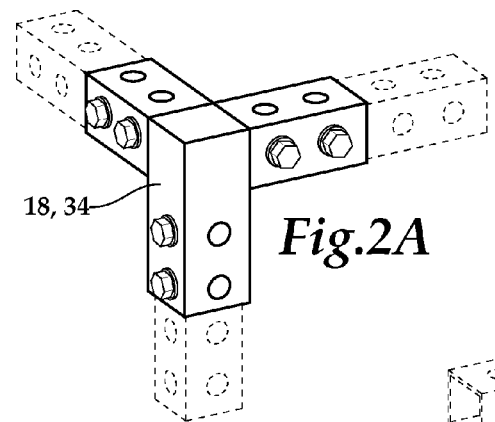
FIGS. 2A-2F are perspective views of connection members for a versatile frame assembly for obstacle course systems according to embodiments of the present disclosure.

FIG. 1 is a perspective view of a versatile frame assembly 10 for obstacle course systems according to an embodiment of the present disclosure. Versatile frame assembly 10 includes a base assembly 12 having a pair of primary rails 14, only one being visible in FIG. 1, and a pair of cross rails 16, only one being visible in FIG. 1. Each primary rail 14 is coupled to each cross rail 16 with a suitable coupling element such as a connection member 18 (see FIG. 2A), three of which are visible in FIG. 1. Primary rails 14 and cross rails 16 may be constructed from any suitable material such as wood or metal. For example, in the illustrated embodiment, primary rails 14 and cross rails 16 are formed from 3 inch by 3 inch tubular metal having a generally square cross section and having generally uniform perforations therethrough to accept connecting means such as bolts, pins or the like. Each primary rail 14 and cross rail 16 may be formed from a single member or may be formed from multiple members that are secured together in a suitable manner such as bolting, pinning, nailing, welding or the like with the use of connecting members if desired.

Figure 2D:
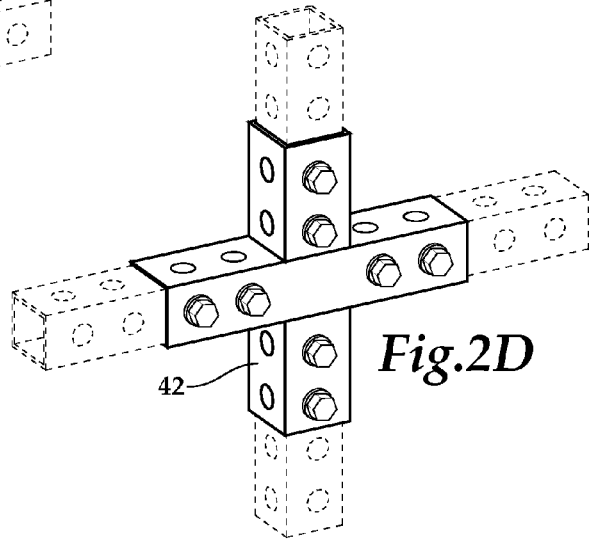
Figure 2B:
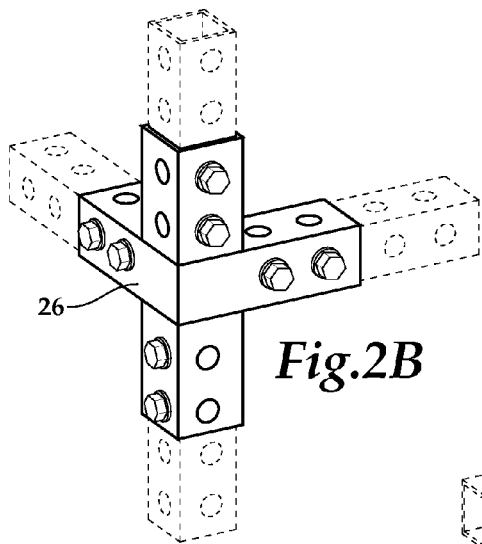
Figure 2E:
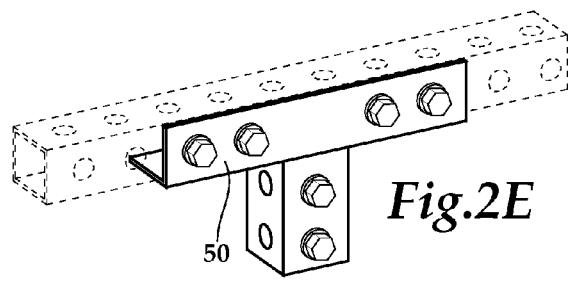
Figure 2C:
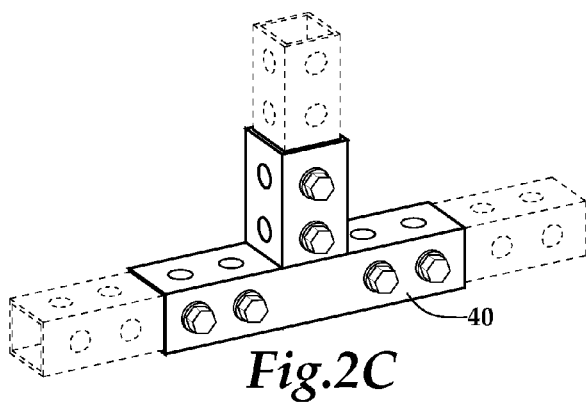
Figure 2F:
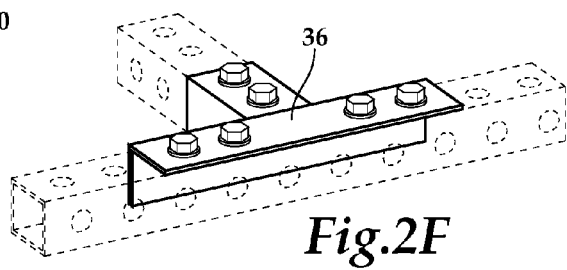

Versatile frame assembly 10 also includes an intermediate assembly 20 having a pair of primary rails 22 and a pair of cross rails 24. Each primary rail 22 is coupled to each cross rail 24 with a suitable coupling element such as a connection member 26 (see FIG. 2B). Versatile frame assembly 10 further includes an upper assembly 28 having a pair of primary rails 30 and a plurality of cross rails 32, five shown in the illustrated embodiment. Each primary rail 30 is coupled to each cross rail 32 with a suitable coupling element such as a connection member 34 (see FIG. 2A) or a connection member 36 (see FIG. 2F). As with primary rails 14 and cross rails 16 of base assembly 12, primary rails 22, 30 and cross rails 24, 32 of intermediate assembly 20 and upper assembly 28 may be constructed from any suitable material and may be formed from a single member or multiple members.

Extending generally vertically between base assembly 12 and intermediate assembly 20 are a plurality of lower support risers 38, six being visible in FIG. 1. The four lower support risers 38 at the corners are coupled between connection members 18 and connection members 26. Additional lower support risers 38 are connected between connection members 40 (see FIG. 2C) and connection members 42 (see FIG. 2D). In addition or as an alternative to some of the lower support risers 38, support braces 44 may be positioned between base assembly 12 and intermediate assembly 20. In the illustrated example, support braces 44 are angled trusses extending between base assembly 12 and intermediate assembly 20. Together, base assembly 12, intermediate assembly 20, lower support risers 38 and support braces 44 form a lower frame assembly 46.

Extending generally vertically between intermediate assembly 20 and upper assembly 28 are a plurality of upper support risers 48, ten shown in the illustrated embodiment. The four upper support risers 48 at the corners are coupled between connection members 26 and connection members 34. Additional upper support risers 48 are connected between connection members 42 and connection members 50 (see FIG. 2E). In addition or as an alternative to some of the upper support risers 48, support braces (not shown) similar to support braces 44 may be positioned between intermediate assembly 20 and upper assembly 28 or between adjacent upper support risers 48, if desired. Together, intermediate assembly 20, upper assembly 28 and upper support risers 48 form an upper frame assembly 52. Lower support risers 38 and upper support risers 40 may be formed as a single member or multiple members.

The illustrated versatile frame assembly 10 may be constructed to be any suitable size depending upon factors such as location of installation, size and age of potential obstacle course participants, size and positioning of the installed obstacle and other factors which should be apparent to those skilled in the art. In one implementation, versatile frame assembly 10 may be about twenty feet tall, eight feet wide and thirty-two feet long. In such an implementation, primary rails 14, 22, 30 would be about thirty-two feet, cross rails 16, 24, 32 would be about eight feet and together, lower support risers 38 and upper support risers 48 would be about twenty feet with, for example, lower support risers 38 being about six feet and upper support risers 48 being about fourteen feet.

As illustrated, a platform assembly 54 is positioned within lower frame assembly 46. Platform assembly 54 includes a launch platform 56, a landing platform 58 and a safety pit 60 that is positioned therebetween. In general, launch platform 56 is used as a starting point of an obstacle positioned within versatile frame assembly 10. Likewise, landing platform 58 is used as an end point of an obstacle positioned within versatile frame assembly 10, arrival at which indicates successful completion of the obstacle. On the other hand, safety pit 60 is generally positioned below the obstacle providing a soft landing for participants that are unsuccessful in completing the obstacle.

Figure 3A:
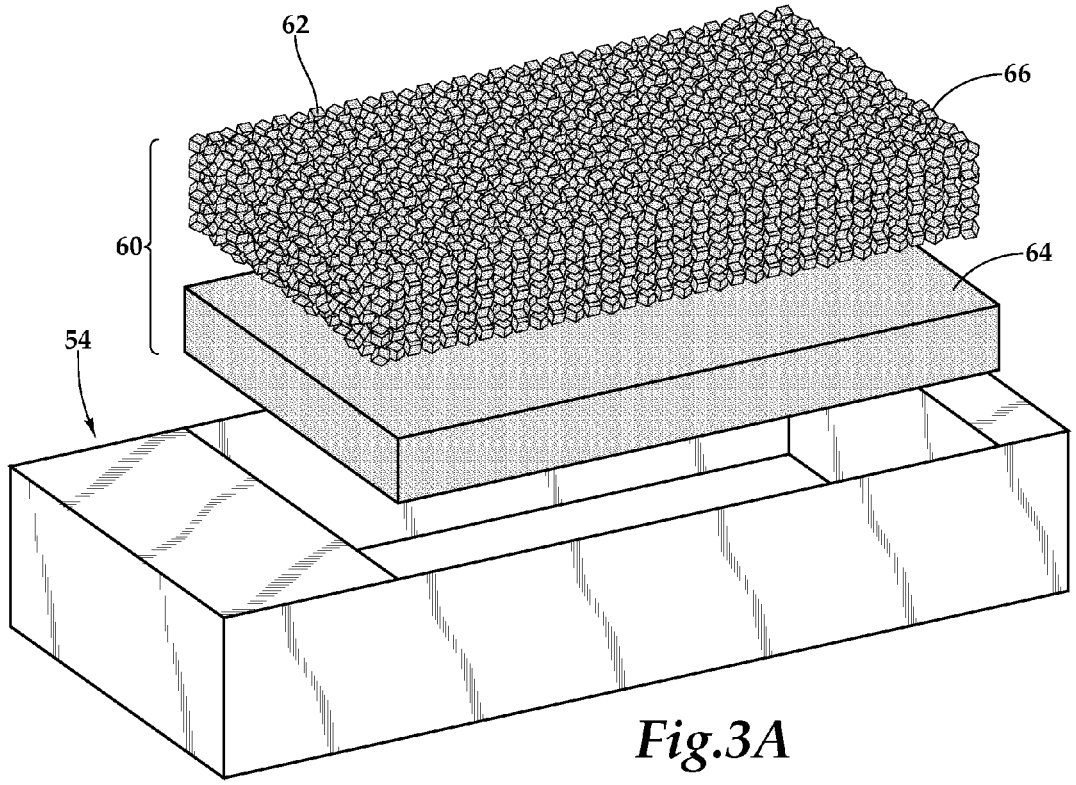
FIGS. 3A-3B are perspective views of platform and safety pit assemblies for a versatile frame assembly for obstacle course systems according to embodiments of the present disclosure.
Figure 3B:
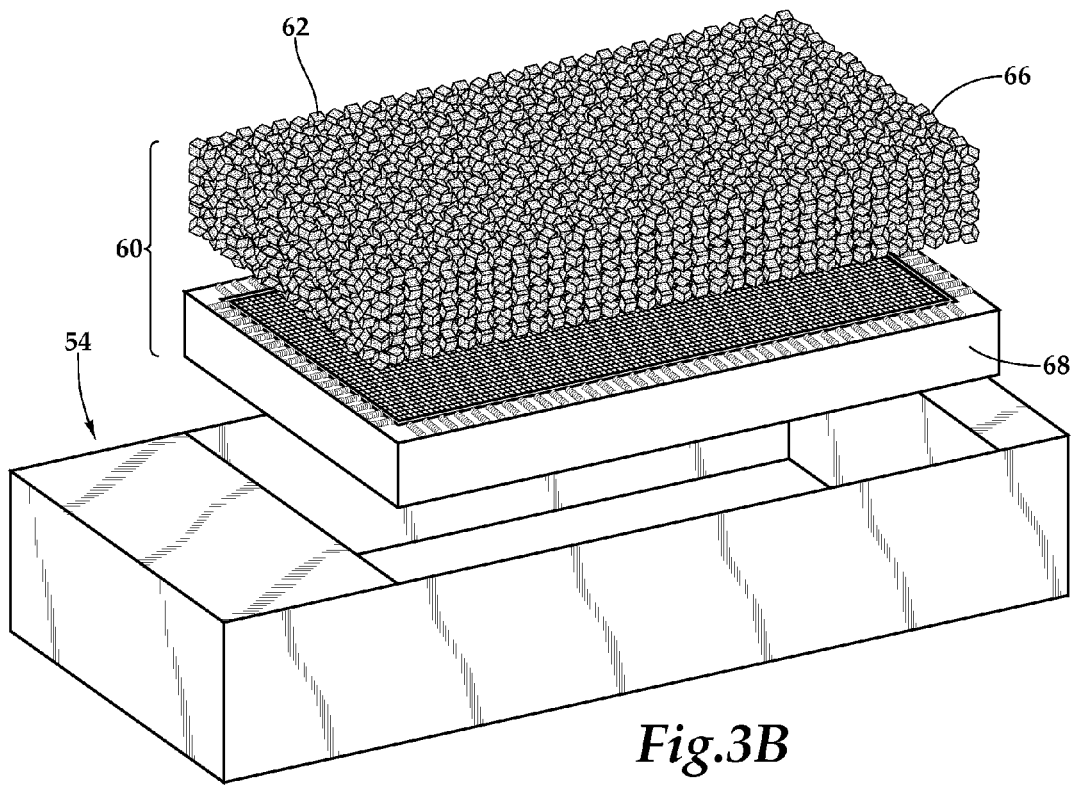

As shown in FIG. 1, safety pit 60 may be a distributed pad system formed from a plurality of individual pad elements 62. Alternatively, as shown FIGS. 3A-3B, safety pit 60 may include a dual pit system for added safety. For example, the safety pit 60 in FIG. 3A includes a generally monolithic lower pad layer 64 and a distributed upper pad layer 66. It is noted that lower pad layer 64 may be formed from multiple pad layers stacked vertically on one another and/or include multiple adjacent pad sections depending upon the length of safety pit 60. For example, if safety pit 60 is eight feet wide by twenty feet long, four eight foot by five foot pads may be used to form generally monolithic lower pad layer 64. In another embodiment, as best seen in FIG. 3B, safety pit 60 includes a resilient lower layer depicted as a trampoline 68 and a distributed upper pad layer 66. The depth of safety pit 60 is determined by factors such as size and age of potential obstacle course participants, size and positioning of the obstacle and other factors which should be apparent to those skilled in the art. In one implementation, safety pit 60 is about six feet deep.

Versatile frame assembly 10 is operable to support any number of different obstacles including agility obstacles, balance obstacles, strength obstacles and the like, generally above safety pit 60. In a first example, as best seen in FIG. 4, therein is depicted a perspective view of a versatile frame assembly 10 supporting a quintuple steps obstacle 80 according to an embodiment of the present disclosure. As illustrated, each of the quintuple steps 82 is supported by intermediate assembly 20 and is adjustable in both height above safety pit 60 and lateral distance from the next quintuple step 82 by a support assembly 84 that is coupled to intermediate assembly 20. In this agility obstacle, a participant would start on launch platform 56 then move through the obstacle by jumping or stepping between the various steps 82 in an effort to reach landing platform 58 including an angled landing step 86 without falling into safety pit 60.

Figure 5:
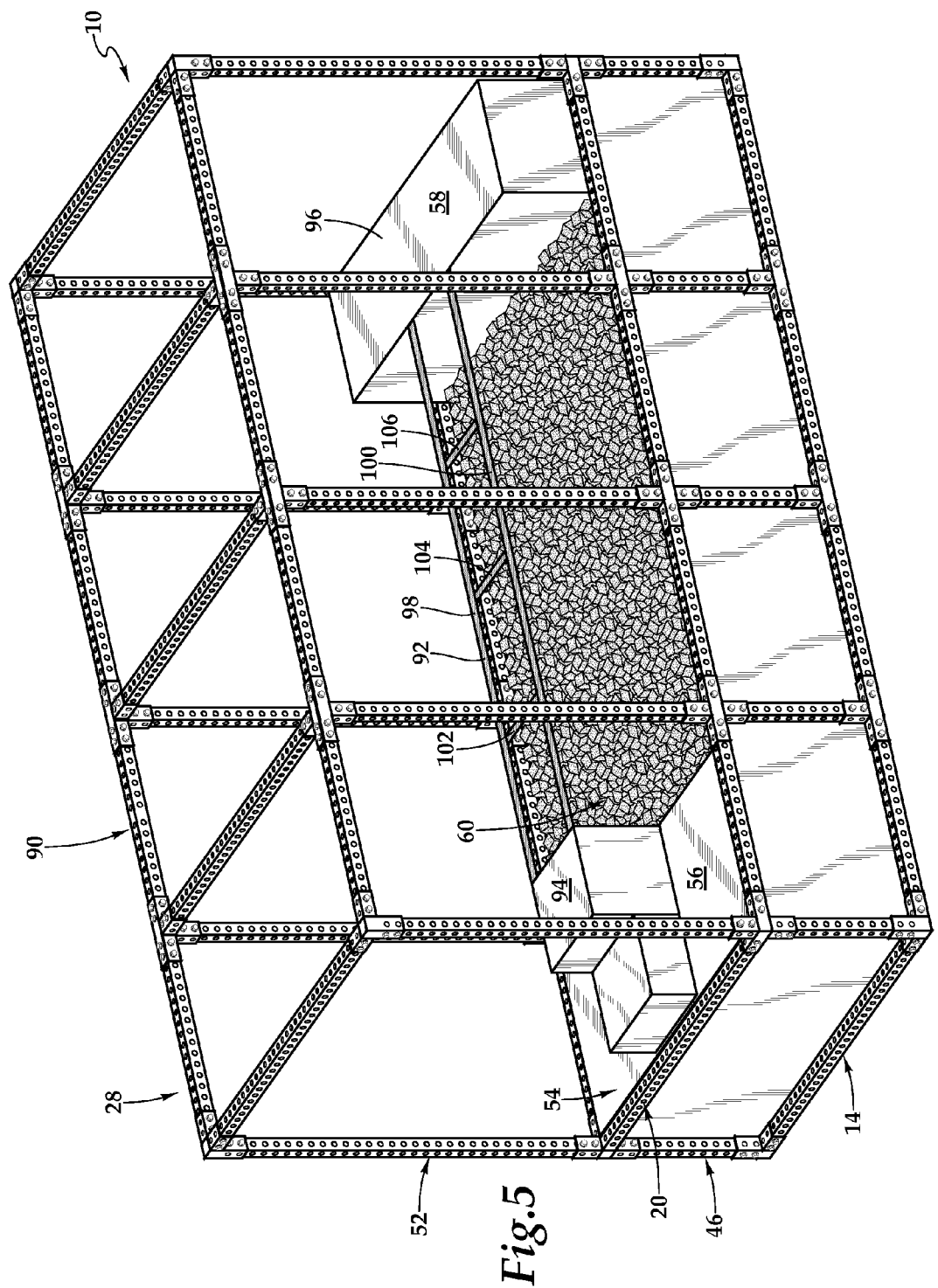
FIG. 5 is a perspective view of a versatile frame assembly supporting a slack ladder obstacle according to an embodiment of the present disclosure.

In a second example, as best seen in FIG. 5, therein is depicted a perspective view of a versatile frame assembly 10 supporting a slack ladder obstacle 90 according to an embodiment of the present disclosure. As illustrated, slack ladder 92 is supported by platform assembly 54 and particularly by steps 94 and raised platform 96. In this balance obstacle, a participant would start on launch platform 56 then move through the obstacle by walking on the outer frame members 98, 100 of slack ladder 92, stepping on rungs 102, 104, 106 of slack ladder 92 or both in an effort to reach landing platform 58 without falling into safety pit 60.

Figure 6:
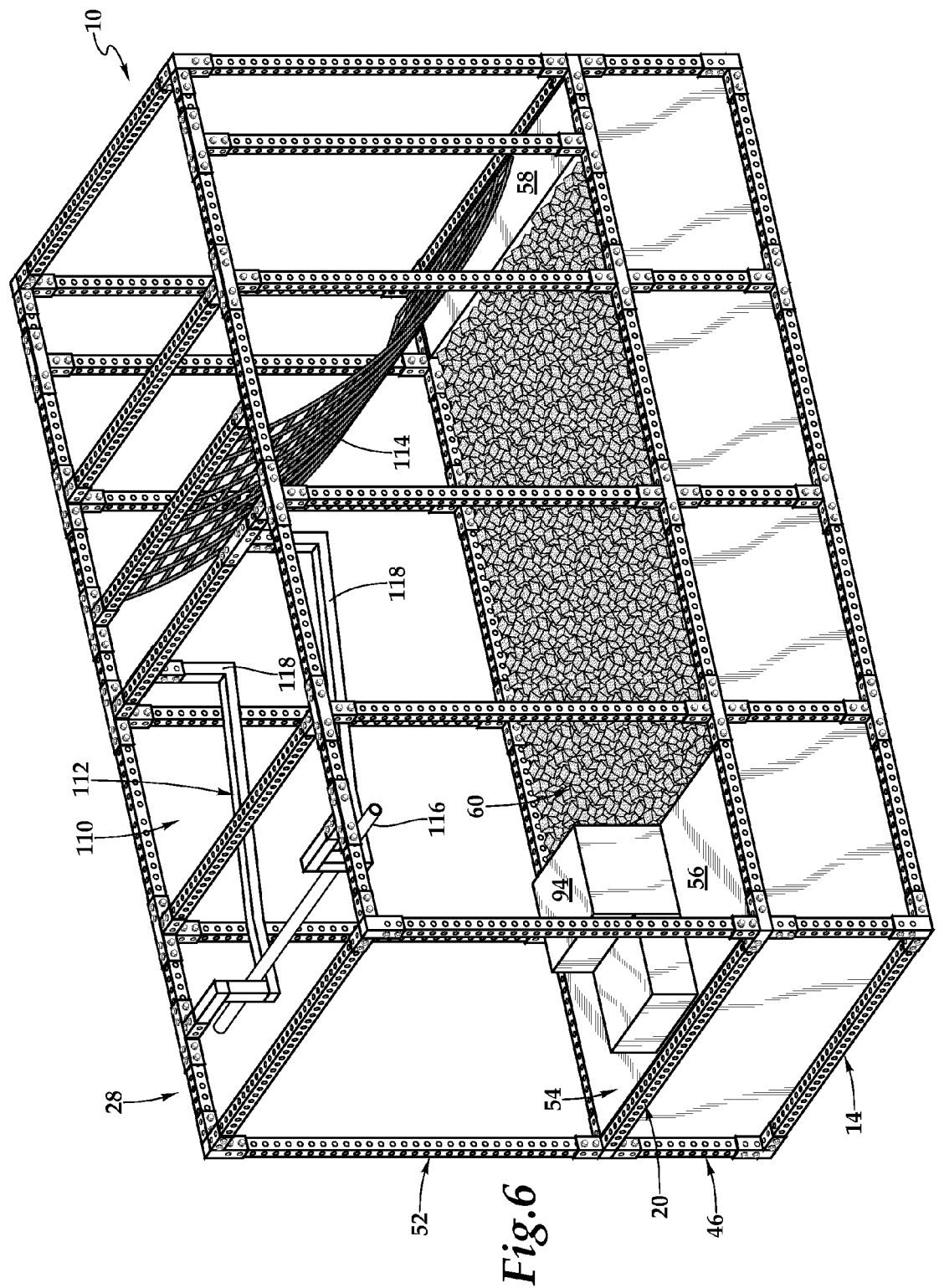
FIG. 6 is a perspective view of a versatile frame assembly supporting a pipe slider/cargo net obstacle according to an embodiment of the present disclosure.

In a third example, as best seen in FIG. 6, therein is depicted a perspective view of a versatile frame assembly 10 supporting a pipe slider/cargo net obstacle 110 according to an embodiment of the present disclosure. As illustrated, a pipe slider 112 and cargo net 114 are generally supported by upper assembly 28. In this strength and agility obstacle, a participant would start on launch platform 56 from steps 94 then jump to bar 116 and propel it down slides 118. At the end of slides 118, the participant must transition from bar 116 to cargo net 114, then traverse down cargo net 114 in an effort to reach landing platform 58 without falling into or touching safety pit 60.

Figure 7:
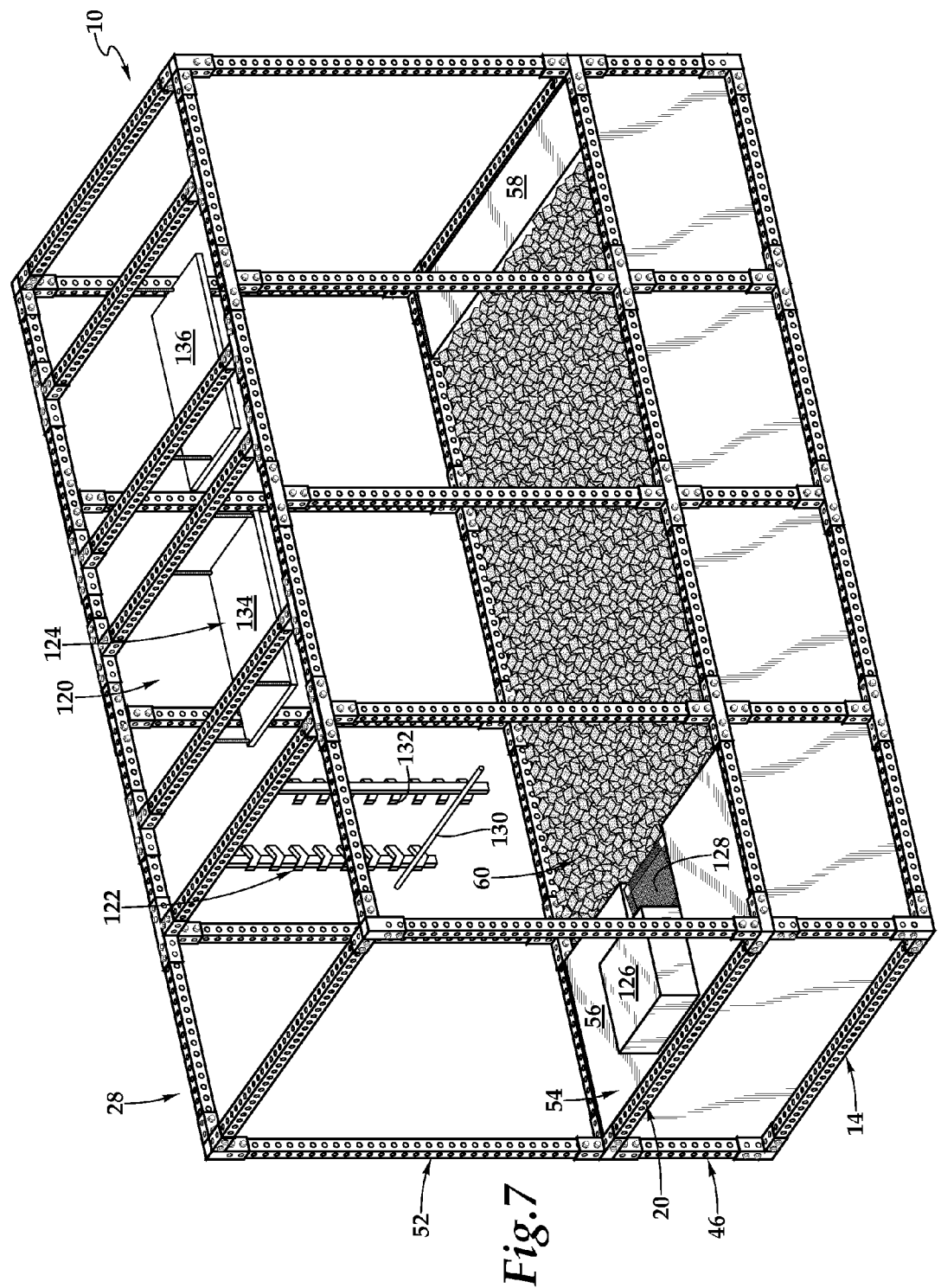
FIG. 7 is a perspective view of a versatile frame assembly supporting a salmon ladder/unstable bridge obstacle according to an embodiment of the present disclosure.

In a fourth example, as best seen in FIG. 7, therein is depicted a perspective view of a versatile frame assembly 10 supporting a salmon ladder/unstable bridge obstacle 120 according to an embodiment of the present disclosure. As illustrated, a salmon ladder 122 and an unstable bridge 124 are supported by upper assembly 28. In this strength obstacle, a participant would start on launch platform 56 from step 126 then jump onto mini trampoline 128 to reach bar 130. The participant must then move bar 130 up the rungs 132 of salmon ladder 122. The participant must then transition from bar 130 to the first bridge element 134 that is supported on four corners. The participant then hand traverses first bridge element 134 and transitions to second bridge element 136 that is supported in the middle at two point. The participant then hand traverses second bridge element 136 in an effort to reach landing platform 58 without falling into safety pit 60.

Figure 8:
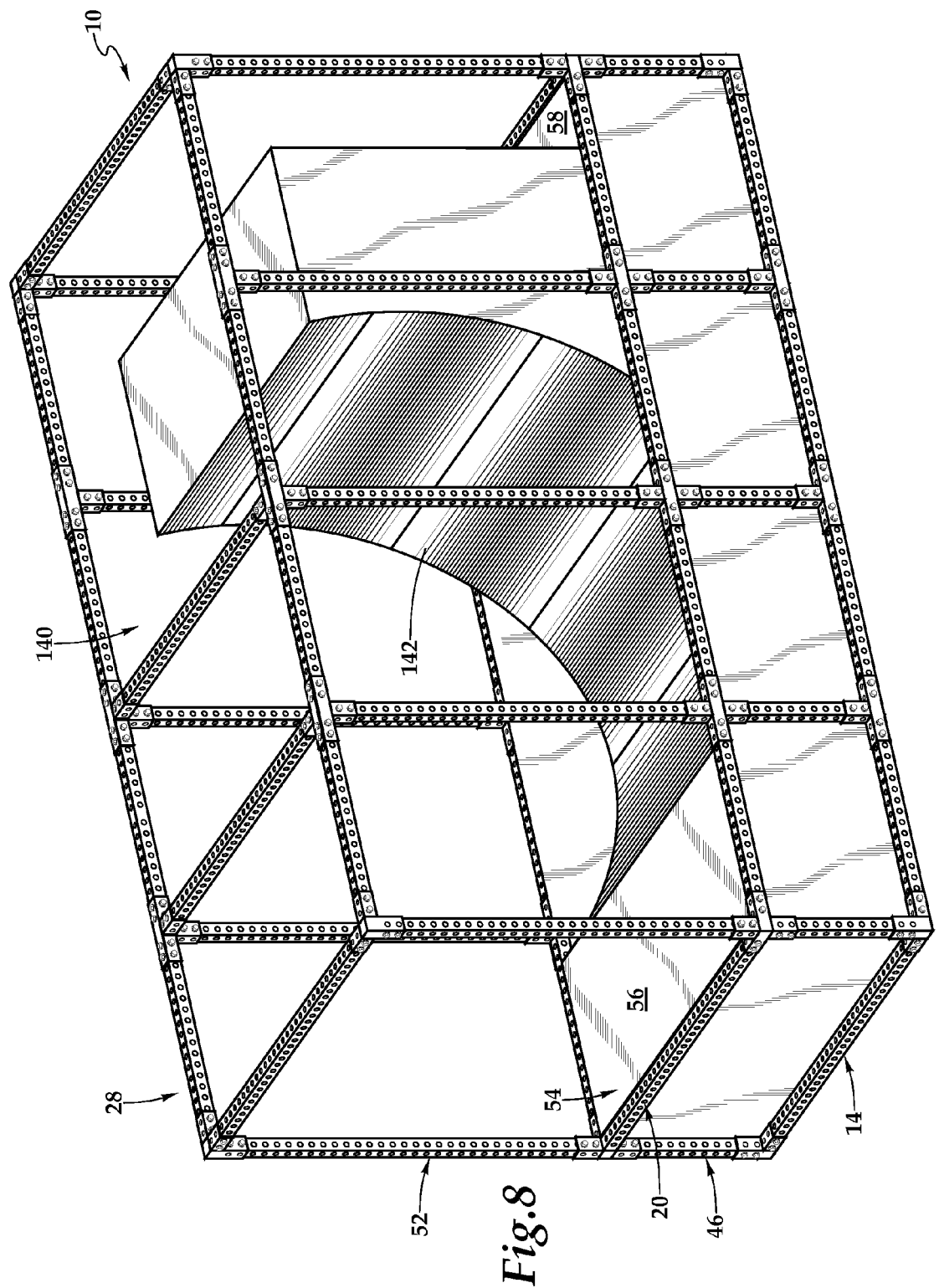
FIG. 8 is a perspective view of a versatile frame assembly supporting a warped wall obstacle according to an embodiment of the present disclosure.

In a fifth example, as best seen in FIG. 8, therein is depicted a perspective view of a versatile frame assembly 10 supporting a warped wall obstacle 140 according to an embodiment of the present disclosure. As illustrated, warped wall 142 is supported by lower frame assembly 46. In this agility obstacle, a participant would start on launch platform 56 then move onto the curved surface of warped wall 142 in an effort to reach the top of warped wall 142 then dismount to landing platform 58.

Figure 9:
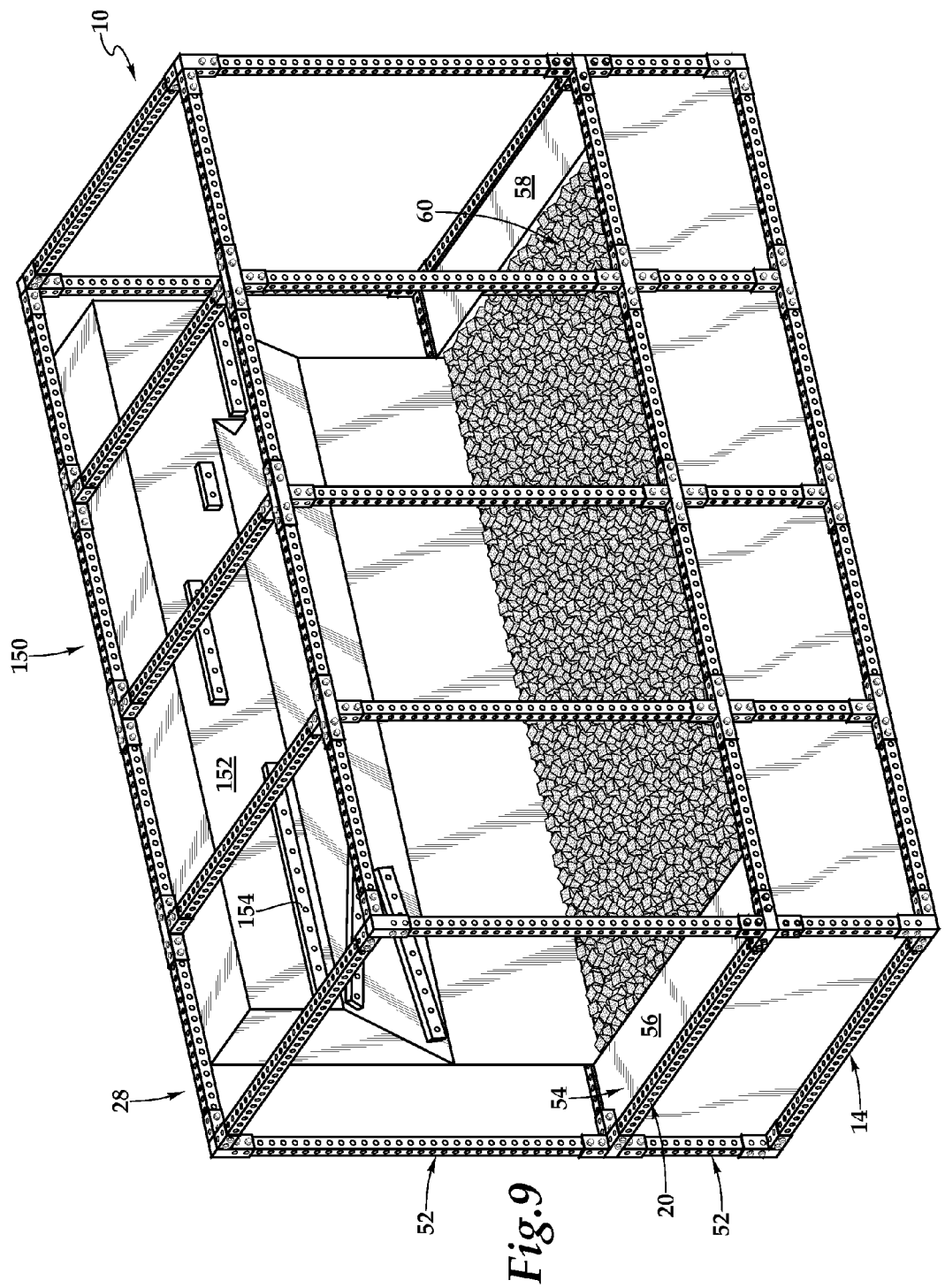
FIG. 9 is a perspective view of a versatile frame assembly supporting an ultimate cliffhanger obstacle according to an embodiment of the present disclosure.

In a sixth example, as best seen in FIG. 9, therein is depicted a perspective view of a versatile frame assembly 10 supporting an ultimate cliffhanger obstacle 150 according to an embodiment of the present disclosure. As illustrated, ultimate cliffhanger 152 is supported by upper assembly 28. In this strength obstacle, a participant would start on launch platform 56 then hand traverse the various rails 154 of ultimate cliffhanger 152 in an effort to reach landing platform 58 without falling into safety pit 60.

Figure 10:
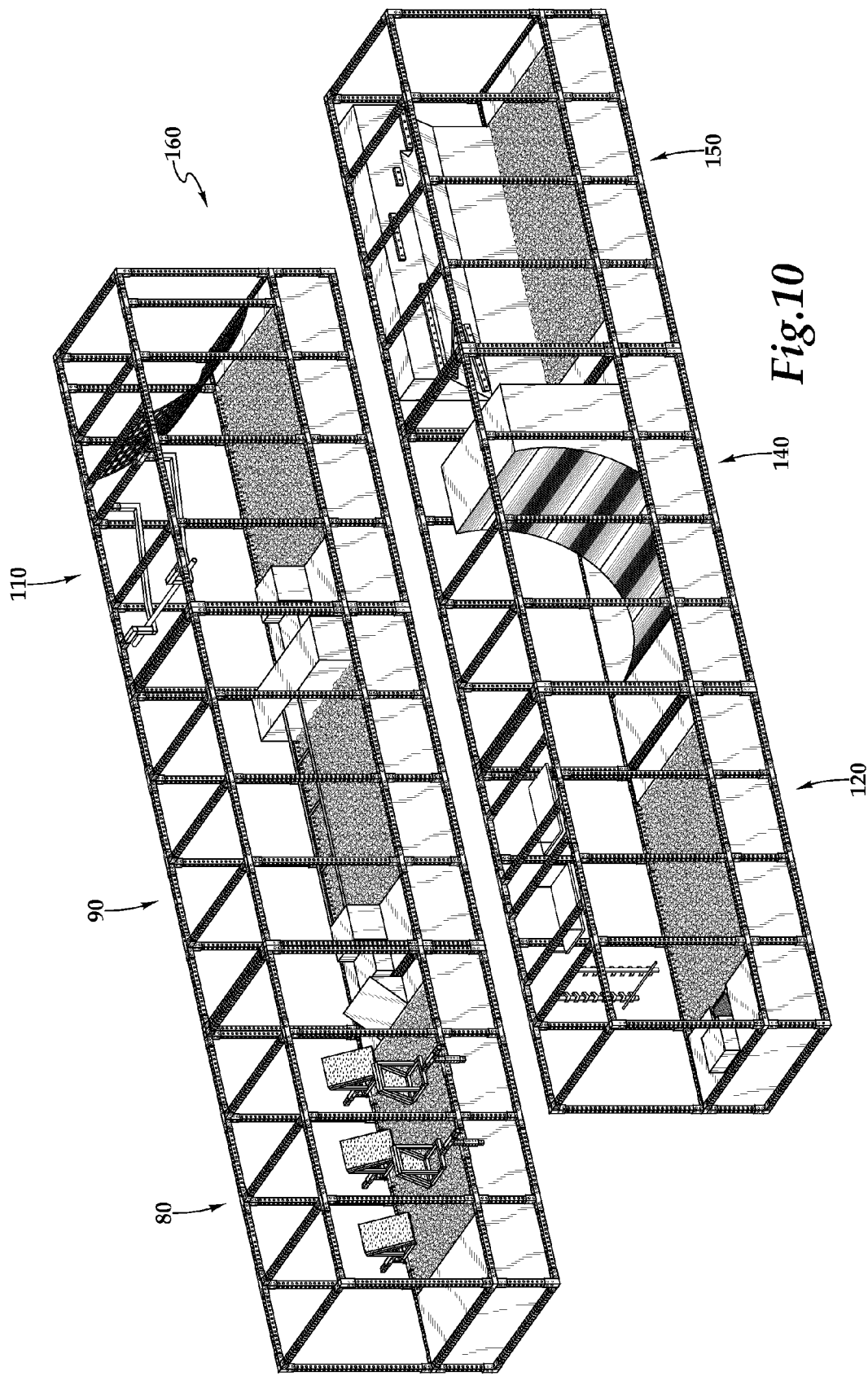
FIG. 10 is a perspective view of a plurality of versatile frame assemblies supporting obstacles in an obstacle course configuration according to an embodiment of the present disclosure.

As best seen in FIG. 10, therein is depicted a perspective view of a plurality of versatile frame assemblies 10 supporting obstacles in an obstacle course configuration according to an embodiment of the present disclosure that is generally designated 160. In the illustrated configuration, obstacle course 160 includes in sequence, quintuple steps obstacle 80, slack ladder obstacle 90, pipe slider/cargo net obstacle 110, salmon ladder/unstable bridge obstacle 120, warped wall obstacle 140 and ultimate cliffhanger obstacle 150. In this configuration, adjacent versatile frame assemblies 10 may be secured together with pins, bolts or similar connection means. Alternatively or additionally, frame elements of adjacent versatile frame assemblies 10, such as quintuple steps obstacle 80 and slack ladder obstacle 90, may be shared. For example, primary rails or cross rails of base assemblies, intermediate assemblies and/or upper assemblies may be shared. Also, frame elements may extend between versatile frame assemblies 10 having space therebetween, such as between quintuple steps obstacle 80 and salmon ladder/unstable bridge obstacle 120. For example, frame elements including telescoping frame elements, may extend between base assemblies, intermediate assemblies and/or upper assemblies such that additional obstacle assemblies or other types of fitness equipment may be attached thereto to utilize the space between versatile frame assemblies 10. As yet another alternative, such frame elements or telescoping frame elements may extend outwardly from one or more versatile frame assemblies 10 from a launch platform end, a landing platform end and/or a side of a versatile frame assembly 10 such that additional obstacle assemblies or other types of fitness equipment may be attached thereto to utilize the space to the exterior of versatile frame assemblies 10.

Use of the versatile frame assemblies 10 of the present disclosure to configure an obstacle course such as obstacle course 160 is particularly useful for obstacle course competitions. Through the use of the versatile frame assemblies 10 of the present disclosure, the particular obstacles selected for inclusion in the course and the particular location within the course to place a particular obstacle is user selectable and can be easily changed as desired. The interchangeability and adjustability provided by the versatile frame assemblies 10 of the present disclosure is also beneficial in a gym environment as space is commonly at a premium. The versatile frame assemblies 10 of the present disclosure allow the gym owner to change the obstacles within various versatile frame assemblies 10 over time thus providing a new and different training experience for gym users. As such, even though obstacle course 160 has been depicted as having a particular number of obstacles, six, in a particular arrangement, three obstacles per row and two row with space between the rows, those skilled in the art will recognize that any desired number of obstacles, both greater than or less than six, in any arrangement having more or less obstacles in each row, more or less rows, no space between rows, frame elements extending from the obstacles and the like may be used and is considered within the scope of the present disclosure.

Figure 11A:
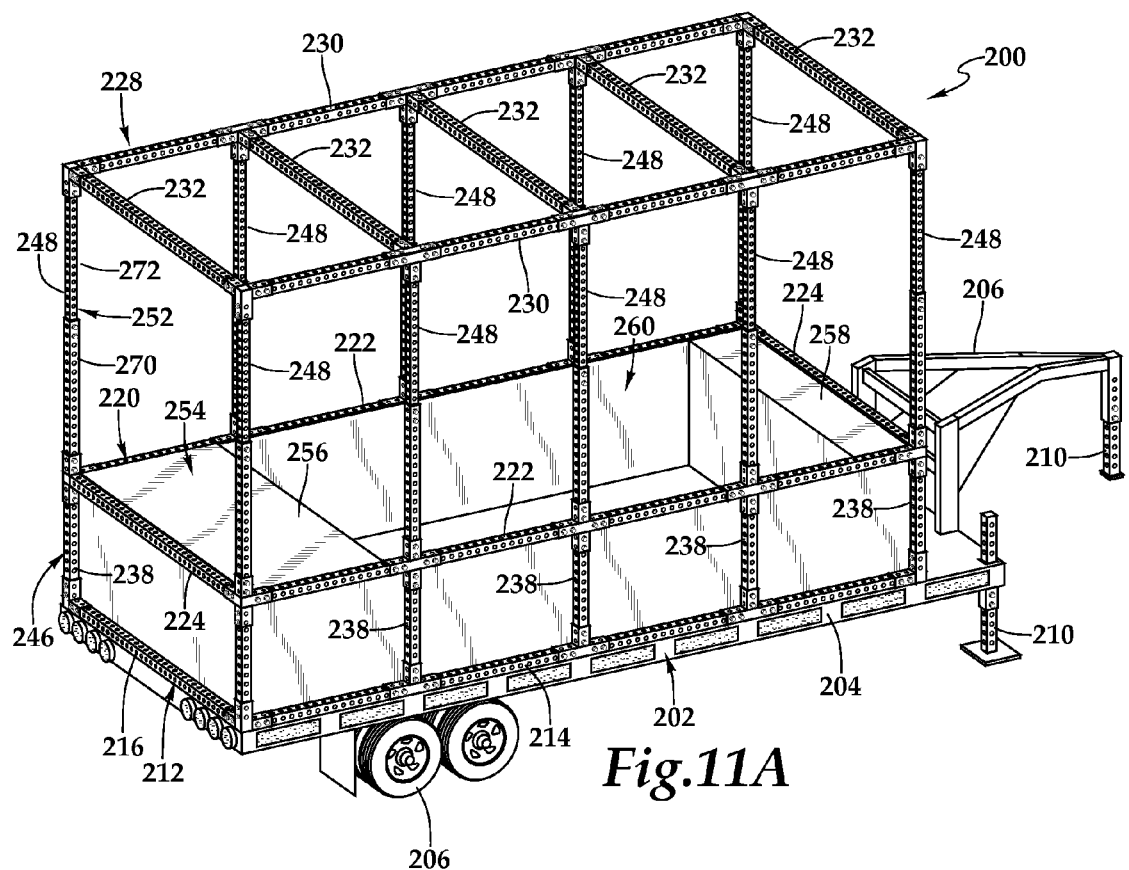
FIGS. 11A-11B are perspective views of a mobile frame assembly for obstacle course systems according to an embodiment of the present disclosure.
Figure 11B:
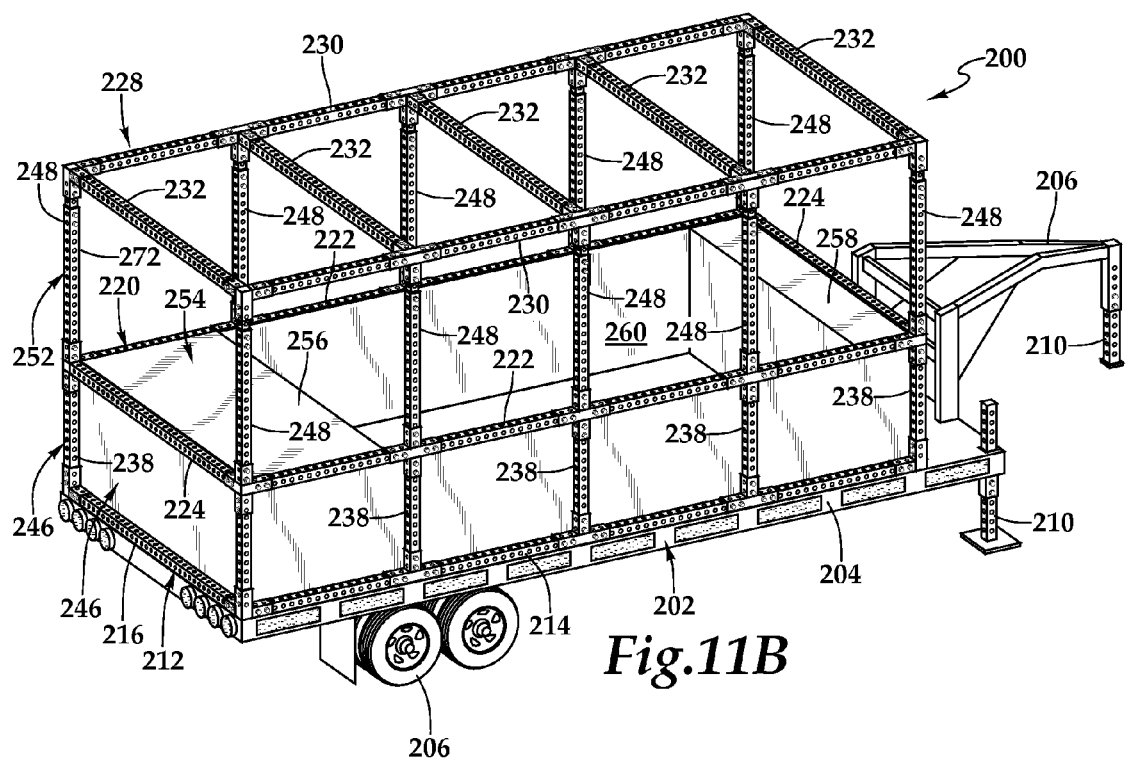

Referring next to FIGS. 11A-11B, therein are depicted perspective views of a mobile frame assembly for obstacle course systems according to an embodiment of the present disclosure that is generally designated 200. Mobile frame assembly 200 includes a trailer assembly 202 having a trailer body 204 and a draw assembly 206 that is securably coupled to trailer body 204. Trailer assembly 202 also has a plurality of wheels 206, only one set being visible in the figures. In its mobile configuration, draw assembly 206 is coupled to a suitable receiving element of a truck (not pictured) or similar vehicle that is operable to transport mobile frame assembly 200 to a desired location. Once mobile frame assembly 200 is positioned in the desired location, one or more legs 210 that are attached to trailer body 204 may be extended to the ground and draw assembly 206 may be decoupled from the receiving element of the truck. Thereafter, leg 210 attached to draw assembly 206 may also be extended to the ground. Additional legs (not shown), guide wires (not shown) or other additional stabilization elements may be attached between trailer body 204 and/or mobile frame assembly 200 and the ground to provide enhanced stabilization to mobile frame assembly 200 during use.

Mobile frame assembly 200 includes a base assembly 212 that is securably attached to trailer body 204 by bolting, welding or other suitable means. Base assembly 212 has a pair of primary rails 214, only one being visible in the figures, and a pair of cross rails 216, only one being visible in the figures. Each primary rail 214 is coupled to each cross rail 216 with a suitable coupling element. Mobile frame assembly 200 also includes an intermediate assembly 220 having a pair of primary rails 222 and a pair of cross rails 224. Each primary rail 222 is coupled to each cross rail 224 with a suitable coupling element. Mobile frame assembly 200 further includes an upper assembly 228 having a pair of primary rails 230 and a plurality of cross rails 232, five shown in the illustrated embodiment. Each primary rail 230 is coupled to each cross rail 232 with a suitable coupling element.

Extending generally vertically and coupled between base assembly 212 and intermediate assembly 220 are a plurality of lower support risers 238, six being visible in the figures. Together, base assembly 212, intermediate assembly 220 and lower support risers 238 form a lower frame assembly 246. Extending generally vertically and coupled between intermediate assembly 220 and upper assembly 228 are a plurality of upper support risers 248, ten shown in the illustrated embodiment. Together, intermediate assembly 220, upper assembly 228 and upper support risers 248 form an upper frame assembly 252.

The illustrated mobile frame assembly 200 may be constructed to be any suitable size depending upon factors such as location of installation, size and age of potential obstacle course participants, size and positioning of the installed obstacle and other factors which should be apparent to those skilled in the art. For example, trailer body 204 may be twenty feet, thirty feet, forty feet, forty-five feet or other length and six feet, seven feet, eight feet or other width.

As illustrated, a platform assembly 254 is positioned within lower frame assembly 246. Platform assembly 254 includes a launch platform 256, a landing platform 258 and a safety pit receiving area 260 that is positioned therebetween. Safety pit receiving area 260 may have installed therein a safety pit of the type described above or other suitable safety system. In general, launch platform 256 is used as a starting point of an obstacle positioned within mobile frame assembly 200. Likewise, landing platform 258 is used as an end point of an obstacle positioned within mobile frame assembly 200 arrival at which indicates successful completion of the obstacle.

Due to the height of mobile frame assembly 200, it may be desirable or necessary to lower upper assembly 228 during transportation and raise upper assembly 228 for obstacle installation and use. To achieve this result, upper support risers 248 may include telescoping members operable to adjust the distance between intermediate assembly 220 and upper assembly 228. As illustrated, each upper support riser 248 includes a sleeve system having an outer sleeve member 270 and an inner sleeve member 272 (see FIGS. 12A-12B) that have a first configuration, wherein inner sleeve member 272 is slidable within outer sleeve member 270, bolts removed for example, and a second configuration, wherein inner sleeve member 272 is secured to outer sleeve member 270, bolts installed for example. In this manner, inner sleeve member 272 and outer sleeve member 270 are operable to telescope relative to one another, as best seen by comparing FIG. 12A to FIG. 12B, to change the length of upper support risers 248, as best seen by comparing FIG. 11A to FIG. 11B. In an alternate system shown in FIGS. 13A-13B, the length of upper support risers 248 can be changed by sliding an upper tubular member 274 within a sleeve 276 that is fixable attached to a lower tubular member 278.

As best seen in FIG. 14, therein is depicted a perspective view of a plurality of mobile frame assemblies 200 supporting obstacles in an obstacle course configuration according to an embodiment of the present disclosure that is generally designated 300. In the illustrated configuration, obstacle course 300 includes in sequence, quintuple steps obstacle 80, slack ladder obstacle 90, pipe slider/cargo net obstacle 110, salmon ladder/unstable bridge obstacle 120, warped wall obstacle 140 and ultimate cliffhanger obstacle 150. As illustrated, bridge assemblies 302 have been secured between adjacent mobile frame assemblies 200 to provide a path therebetween. Use of the mobile frame assemblies 200 of the present disclosure to configure an obstacle course such as obstacle course 300 is particularly useful for temporary obstacle course set ups in parks, schools or other locations for obstacle course training and competitions.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

What is claimed is:

1. A mobile frame assembly for obstacle course systems comprising:
    a trailer assembly having a trailer body, a draw assembly coupled to the trailer body and wheels operably associated with the trailer body;
    a base assembly securably mounted to the trailer assembly, the base assembly having at least two base assembly primary rails;
    an intermediate assembly having at least two intermediate assembly primary rails;
    an upper assembly having at least two upper assembly primary rails;
    a plurality of lower support risers coupled to the base assembly primary rails and extending at least to the intermediate assembly primary rails forming a lower frame assembly;
    a plurality of upper support risers coupled to the intermediate assembly primary rails and extending at least to the upper assembly primary rails;
    a platform assembly including a launch platform, a landing platform and a safety pit positioned therebetween, the platform assembly disposed at least partially within the lower frame assembly; and
    at least one obstacle assembly disposed generally within the mobile frame assembly over the safety pit;
    wherein at least some of the upper support risers further comprise telescoping members operable to expand the distance between the at least one obstacle and the safety pit.

2. The mobile frame assembly as recited in claim 1 wherein the trailer assembly further comprises at least one support leg.

3. The mobile frame assembly as recited in claim 1 wherein the telescoping members further comprise inner and outer sleeve members wherein, in a first configuration, the inner sleeve member are slidable within the outer sleeve members and, in a second configuration, the inner sleeve members are secured to the outer sleeve members.

4. The mobile frame assembly as recited in claim 1 wherein the safety pit further comprises a generally monolithic lower pad layer and a distributed upper pad layer.

5. The mobile frame assembly as recited in claim 1 wherein the safety pit further comprises a resilient lower layer and a distributed upper pad layer.

6. The mobile frame assembly as recited in claim 1 wherein the at least one obstacle assembly is selected from the group consisting of agility obstacles, balance obstacles and strength obstacles.

7. The mobile frame assembly as recited in claim 1 wherein the at least one obstacle assembly is secured to at least one of the platform assembly, the intermediate assembly, the upper assembly and the upper support risers.

8. The mobile frame assembly as recited in claim 1 wherein the at least one obstacle is selected from the group consisting of a quintuple steps obstacle, a slack ladder obstacle, a cargo net obstacle, a pipe slider obstacle, a salmon ladder obstacle, an unstable bridge obstacle, a warped wall obstacle and a cliffhanger obstacle.

9. The mobile frame assembly as recited in claim 1 wherein the lower support risers are independent from the upper support risers.

10. The mobile frame assembly as recited in claim 1 wherein the intermediate assembly further comprises at least two intermediate assembly cross rails that are coupled to the intermediate assembly primary rails.

11. A mobile obstacle course system comprising:
    a plurality of mobile frame assemblies positioned in sequence relative to one another, the mobile frame assemblies including:
    a trailer assembly having a trailer body, a draw assembly coupled to the trailer body and wheels operably associated with the trailer body;
    a base assembly securably mounted to the trailer assembly, the base assembly having at least two base assembly primary rails;
    an intermediate assembly having at least two intermediate assembly primary rails;
    an upper assembly having at least two upper assembly primary rails;
    a plurality of lower support risers coupled to the base assembly primary rails and extending at least to the intermediate assembly primary rails forming a lower frame assembly;

a plurality of upper support risers coupled to the intermediate assembly primary rails and extending at least to the upper assembly primary rails;

a platform assembly including a launch platform, a landing platform and a safety pit positioned therebetween, the platform assembly disposed at least partially within the lower frame assembly; and at least one obstacle assembly disposed generally within the mobile frame assembly over the safety pit;

wherein at least some of the upper support risers further comprise telescoping members operable to expand the distance between the at least one obstacle and the safety pit.

12. The mobile obstacle course system as recited in claim 11 wherein at least two of the mobile frame assemblies are secured together.

13. The mobile obstacle course system as recited in claim 11 wherein groups of the mobile frame assemblies are positioned in rows.

14. The mobile obstacle course system as recited in claim 11 further comprising bridge assemblies extending between pairs of the mobile frame assemblies.

15. The mobile obstacle course system as recited in claim 11 wherein the telescoping members further comprise inner and outer sleeve members wherein, in a first configuration, the inner sleeve member are slidable within the outer sleeve members and, in a second configuration, the inner sleeve members are secured to the outer sleeve members.

16. The mobile obstacle course system as recited in claim 11 wherein the safety pits further comprises a resilient lower layer and a distributed upper pad layer.

17. The mobile obstacle course system as recited in claim 11 wherein the obstacle assemblies are selected from the group consisting of agility obstacles, balance obstacles and strength obstacles.

18. The mobile obstacle course system as recited in claim 11 wherein the obstacle assemblies are selected from the group consisting of a quintuple steps obstacle, a slack ladder obstacle, a cargo net obstacle, a pipe slider obstacle, a salmon ladder obstacle, an unstable bridge obstacle, a warped wall obstacle and a cliffhanger obstacle.

19. The mobile obstacle course system as recited in claim 11 wherein the lower support risers are independent from the upper support risers.

20. The mobile obstacle course system as recited in claim 11 wherein the intermediate assemblies further comprises at least two intermediate assembly cross rails that are coupled to the intermediate assembly primary rails.

\* \* \* \* \*